May 20, 1958 J. R. DAY 2,835,799

DIVERSITY RECEIVING SYSTEM

Filed June 24, 1955 2 Sheets-Sheet 1

INVENTOR.
James R. Day
BY
Moses, Nolte, Crews & Berry
ATTORNEYS

May 20, 1958 J. R. DAY 2,835,799

DIVERSITY RECEIVING SYSTEM

Filed June 24, 1955 2 Sheets-Sheet 2

INVENTOR.
James R. Day

BY

Moser, Nolte, Crews & Berry
ATTORNEYS

United States Patent Office 2,835,799

Patented May 20, 1958

2,835,799

DIVERSITY RECEIVING SYSTEM

James R. Day, Peconic, N. Y.

Application June 24, 1955, Serial No. 517,851

11 Claims. (Cl. 250—20)

The present invention relates to a diversity receiving system and particularly to a system of this type applicable to F. M. reception.

The advantages of diversity reception have been known for a long time. In diversity reception, advantage is taken of the fact that the signals at two separate receiving sites or two separate frequencies only infrequently fade at the same time. For this reason, it is possible to materially to improve the reliability of reception if a way can be found to either combine the two signals so as to keep their sum at an optimum value or to select between them, always selecting the better signals as their ratio varies. While this has been done for A. M. reception, and it is very desirable to accomplish the same results in F. M. reception, there has, to my knowledge, been no satisfactory method or system proposed or proven in use for F. M. diversity reception.

It has been discovered lately that radio frequency signals of the frequency of 100 megacycles or more, are far more useful well beyond the horizon than had previously been supposed. Reception beyond the horizon is due to scatter propagation, which is peculiarly subject to fading which is rapid although not generally very great. In other words, the signal level well beyond the horizon has a much better average value than had been expected but is subject to continuous small fluctuations that seriously interfere with the reliability of reception. Consequently diversity reception of scatter propagation is very desirable.

In an F. M. system the output of the receiver is always constant when the radio signal is above a threshold value due to the inherent limiting in the receiver. The modulation output of the receiver is always accompanied by noise, the amplitude of which is inversely proportional to that of the radio frequency signal being received. Thus, a small radio frequency signal will cause a high level of noise in the receiver output and a large radio frequency signal will cause a low level of noise, the relationship between the noise and the amplitude of the radio frequency signal being linear. This relationship is utilized in the present invention to achieve an optimum combination of the signal outputs of the receivers in a manner which will be described in detail hereinafter.

Another characteristic of the signals to be combined which is utilized by the present invention is that the modulation component of the several receivers can be made equal in amplitude and phase by limiting in F. M. receivers and by A. G. C. circuits in A. M. receivers, whereas the noise outputs of the several receivers are independent or uncorrelated, at least in the case of thermal noise, which is the most important case. This characteristic is utilized in the present invention by supplying the outputs of the receivers to a combining circuit which produces a modulation voltage output equal to the sum of the modulation voltages of the several receivers, but which produces a noise voltage output which is equal to the R. M. S. value of the receiver noise outputs. As a result, a gain in the signal to noise power ratio is obtained equal to the number of receivers used.

It is an object of the present invention to provide an improved diversity reception system.

It is another object of the invention to provide a diversity reception system for F. M. signals.

It is another object of the invention to provide a plurality of receivers for diversity reception, each of which has a noise output inversely proportional to the amplitude of the received radio frequency signal and to combine the signal outputs of the receivers while varying the output of each receiver inversely in accordance with the noise output of said receiver.

It is a further object of the invention to provide a diversity receiving system in which the signal output is muted when the outputs of all the receivers fall below a predetermined level.

The foregoing objects and advantages and others are obtained according to the invention in a manner which will be fully understood from the following description and the drawing in which.

Figure 1:
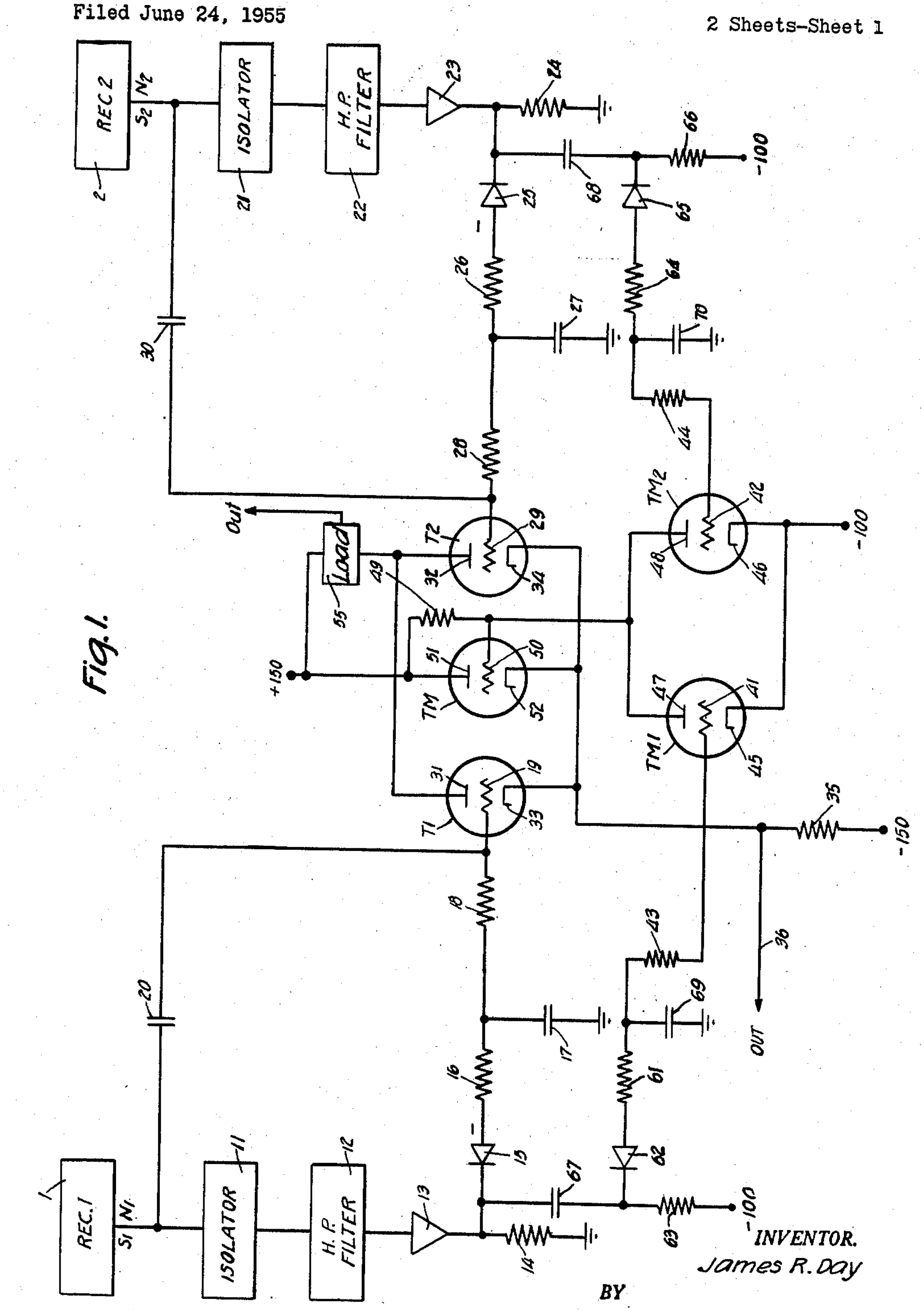
Fig. 1 is a circuit diagram of one embodiment of the invention.

Referring to Fig. 1, there is shown a pair of diversity receivers 1 and 2 which may be spaced from each other, or may operate at different frequencies, or may be connected to antennas at different locations to provide diversity reception. There may, of course, be any number of such receivers each connected in the manner to be described hereinafter but for the sake of simplicity of explanation, the invention will be described with reference to only two receivers. The receivers are of the type which produce an output consisting of signals S1 and S2 which normally have substantially equal amplitudes and are correlated or coherent in the sense that they vary in the same manner at the same time. Receivers 1 and 2 also have noise outputs N1 and N2 respectively. When the received signals at receivers 1 and 2 are of equal amplitude, the noise outputs N1 and N2 are also equal, provided the receivers are identical. When the received signals at the two receivers are not equal, the noise outputs are unequal and inversely proportional to the amplitude of the received signals. Receivers having these characteristics are F. M. receivers having limiters and receivers having automatic gain control. The output of receiver 1 is connected to a high pass filter 12 preferably through an isolating electron tube 11. If for the sake of definiteness, it is assumed that the modulation frequencies in the system extend from 200 cycles per second to 200 kilocycles per second, the high pass filter 12 may have a cut-off frequency of about 300 kilocycles per second, which is above the useful modulation frequency. The output of filter 12 therefore contains no modulation frequency but consists only of the noise signal N1. This noise signal is fed through an amplifier 13 across a load resistor 14. The noise signal N1 impressed across resistor 14 is rectified by the rectifier 15 which is poled so as to provide a negative bias for the control grid 19 of tube T1, the negative bias being applied to the control grid through a filter circuit consisting of a resistor 16, a condenser 17 and an isolating resistor 18. The signal and noise frequencies S1 and N1 are fed to the control grid of tube T1 through a condenser 20.

In a similar manner the output of receiver 2 is fed through a high pass filter connected to the output of the receiver preferably by an isolating electron tube 21. The output of the high pass filter is then amplified by amplifier 23 and impressed across the load resistor 24, to which a rectifier 25 is connected for developing a negative bias voltage. The bias voltage is filtered by the resistor 26, by-pass condenser 27 and then impressed on the control grid 29 of tube T2 through the isolating resistor 28. Both the signal output S2 and the noise output N2 of receiver 2 are fed through condenser 30 to the control grid of tube T2.

The anodes of tubes T1 and T2 may be connected through a load 55, such as a transformer or an impedance, or connected directly to a source of positive voltage, for example, plus 150 volts. The cathodes 33 and 34 of tubes T1 and T2 are also connected together and extend to a source of minus voltage, say minus 150 volts, through a resistor 35 which forms the load resistor for tubes T1 and T2. The useful signal output may be developed across the resistor 35 and taken off by means of an output lead 36, or across the load 55.

The operation of the circuit as so far described will now be explained.

The tubes T1 and T2 may be considered as two sources with their outputs tied in parallel. The load for one, then, is the impedance looking back into the other. If we take the case of two tubes and assume the control voltages are momentarily each zero, and the signals equal and coherent, the grids will then be executing coherent excursions, and considered individually the cathodes potentials will be varying in the same manner, and, therefore, will present no loading one to the other. Thus, although the tubes are physically connected in parallel, they are each acting without loading by the other. This will be true only when the signals on the grids are coherent, i. e., vary in the same phase.

Figure 2:
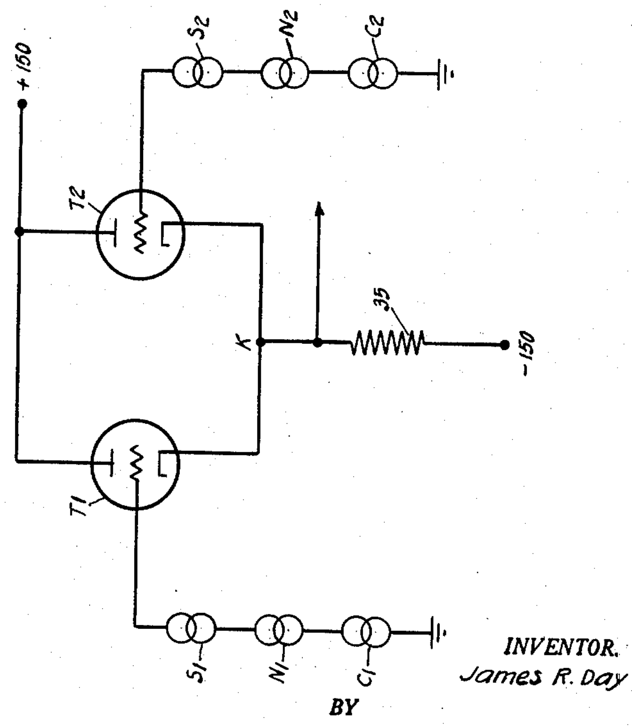
Fig. 2 is a simplified circuit diagram for the purposes of illustrating the principles of the combining circuit.

Fig. 2 shows in simplified form the circuit of tubes T1 and T2 of Fig. 1, having voltage sources S1, N1 and C1 and S2, N2 and C2 connected to their control grids where C1 and C2 represent the bias voltages, N1 and N2 represent the noise voltages, and S1 and S2 represent the signal voltages. For the moment, let us imagine that the inputs are two identical signals S. Since, as explained before, there is no impediment one output to the other, and since cathode followers have a gain of nearly unity, there will appear at the common cathode terminal K a signal S. If, now, we make one of the signals, say S2, equal to zero, the cathode of tube T2, not now following any signal on its grid, will oppose or load the variations in the cathode voltage of T1 in response to the signal on the grid of tube T1. Since the internal resistance of these two cathode followers, looking into either of them, is equal, we now have the case of a generator, namely, tube T1, loaded by a load equal in magnitude to its own internal impedance. This has the effect of cutting the output voltage in half, as compared to the open circuit voltage. This is essentially the action of all the individual uncorrelated noise components N1 and N2, that is to say, that the gain of the combiner stage consisting of tubes T1 and T2 is one-half to each of the separate noise inputs, whereas it is unity to the two equal signal inputs. Now, since the noise power output is the root mean square of the noise components, the noise will be the square root of the sum of the squares of the noise amplitudes halved or $$N_s=\sqrt{\left(\frac{N_1}{2}\right)^2+\left(\frac{N_2}{2}\right)^2}$$

while the output will be S for the signal. As stated previously, when N1 happens to equal N2, which occurs for equal radio signals, there will be an improvement in the output signal to noise power ratio of 2 to 1. If three signals are combined under the same assumptions, the gain in power in the combined signal to noise ratio would be three-fold instead of two-fold, and for four signals the gain would be four-fold, etc.

Now consider the combining action when the noise outputs of the two receivers are not equal. To illustrate this, assume that momentarily receiver 1 has a good signal and receiver 2 has a poor signal. In this case N1 will be smaller than N2. If tubes T1 and T2 were not differently biased, the output sum, so far as noise is concerned, would be the root mean square sum of the normal N1 and the greater N2, and since the signals are equal, this would mean a deterioration in the combined output. But now the bias or control voltage C2 for tube T2 is more negative than bias voltage C1 for tube T1. This will bias tube T2 in a direction to decrease its direct current output, and lower its transconductance, which in turn increases its internal impedance as a generator. The effect of this effective impedance change may be explained with reference to Fig. 3.

Figure 3:
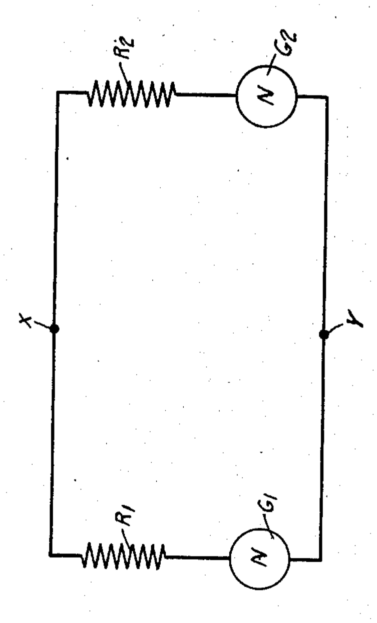
Fig 3 is a schematic diagram illustrating the operation of the combined circuit.

In Fig. 3, G1 and G2 are the equivalent generator voltages looking back into tubes T1 and T2, and R1 and R2 are their respective internal resistances. If, as we have just described, by increasing bias C2 according to the higher noise N2, we increase the value of R2, the proportion of G2 which appears across the output terminals X and Y is reduced if R1 retains its original low value. It is to be noted that this applies only for uncorrelated signals.

Thus, it can be seen that by suitably proportioning the amplifications of amplifiers 13 and 23, and adjusting the operating conditions of tubes T1 and T2, it is possible to differentially control their transconductances to always furnish an optimum combination so far as low noise in the output is concerned. And, further, this differential control by means of biases C1 and C2 will have no effect on the signal amplitude produced by identical signals.

If one of the tubes, say T1, receives a better signal than the other tube, then the bias applied to T1 will be smaller and tube T1 will draw a large current through resistor 35, which will produce a high bias on the other tube. Because of this action a tube receiving a good signal helps to cut off or reduce the noise contributions by the tube or tubes in branches receiving poor signals.

In order to insure that the useful signals S shall arrive at the combiner tubes T1 and T2 substantially in phase the electrical distances from the antennas to tubes T1 and T2 are substantially equalized.

If the signals at both receivers should fade simultaneously, then the output would contain only noise and no signal. Under such conditions the biases C1 and C2, for example, would both be large and negative. It is often desirable to mute or cut off this output when the circuit is useless by reason of simultaneous fading.

Referring again to Fig. 1, there is shown a circuit arrangement for obtaining such muting. A pair of muting control tubes TM1 and TM2 have their control grids 41 and 42 connected to biasing circuits consisting of resistors and rectifiers 43, 61, 62, 63 and 44, 64, 65 and 66, respectively. These biasing circuits are connected to resistors 14 and 24 by condensers 67 and 68 and include filtering condensers 69 and 70. A source of biasing voltage, for example 100 volts, is connected to resistors 63 and 66. The cathodes 45 and 46 of tubes TM1 and TM2 are connected to a source of negative voltage, for example, minus 100 volts, whereas the anodes 47 and 48 are connected through a load resistor 49 to a source of positive voltage, for example the 150 volt source connected to the anodes of tubes T1 and T2. A muting tube TM has its control grid 50 connected to the anodes 47 and 48 of tubes TM1 and TM2, its anode 51 connected directly to the 150 volt source and its cathode 52 connected directly to the cathodes 33 and 34 of tubes T1 and T2. When receivers 1 or 2 are receiving a useful signal, the control bias supplied to the grids 41 and 42 will be insufficient to bias one of these tubes to cut off. Therefore an anode current will flow through the resistor 49 which is sufficient to bias the grid 50 so as to cut off tube TM. The muting tube TM will therefore have no effect when either receiver 1 or receiver 2 receiving a useful signal. If the signals should fade in receivers 1 and 2 below the useful threshold, then the noise signals N1 and N2 would become large and would produce large control biases. These control biases applied to the grids 41, 42 would cut off the tubes TM1 and TM2, and the cut off bias would then not be developed across the resistor 49. Tube TM would then remain conducting and draw a sufficiently large current through the common load resistor 35 to bias tubes T1 and T2 so that they would produce no signal output or noise output. Thus the circuit is muted when the signals fall below a useful threshold value.

While I have described only one embodiment of my invention to illustrate the principles thereof, it will be understood that said embodiment is merely illustrative and many changes and variations can be made therein without departing from the spirit and scope of my invention as defined in the following claims.

I claim:

1. A diversity reception system comprising a plurality of radio frequency receiving means for normally producing substantially equal modulation frequency signal outputs and noise outputs which vary inversely with the amplitudes of the respective radio frequency inputs, a noise channel including frequency selective means connected to the output of each receiving means for selecting noise voltages only, means in each channel for rectifying said noise voltages to produce a biasing voltage, combining means including a plurality of combining electron tubes each having a control electrode and a single load impedance connected to said tubes, means for impressing the biasing voltage and the signal output from each receiving means on one of said control electrodes respectively and means for obtaining an output signal voltage from said load impedance, said electron tubes being connected as a plurality of cathode followers and said load impedance being a resistance connected to the cathodes of all said cathode followers to form a common cathode load resistor therefor.

2. A system according to claim 1, wherein the channel connected to each receiving means comprises an electron tube circuit connected to the output of said receiving means, a high pass filter connected to said electron tube circuit having a cut-off frequency which is higher than the highest useful signal frequency, and said rectifying means being poled so as to impress negative biasing potentials on the control electrodes.

3. A diversity receiving system according to claim 1, wherein each channel includes an electron tube circuit connected to the output of the respective receiving means, a high pass filter circuit connected to the output of said electron tube circuit having a cut-off frequency above the frequency of the useful signals, an amplifier connected to the output of said filter circuit, the rectifying means of said channel being connected to the output of said amplifier and poled so as to impress a negative biasing potential on the control electrode of the cathode follower connected to said channel.

4. A diversity receiving system according to claim 1, including means for biasing said electron tubes to cut-off in response to noise outputs of a predetermined magnitude from all said receiving means.

5. A diversity receiving system according to claim 1, including a plurality of muting electron tubes including control electrodes, means for impressing one of said biasing voltages on a control electrode of each of said muting tubes and means responsive to the combined output of said muting tubes for biasing the combining tubes to cut off.

6. A diversity receiving system according to claim 5, wherein said last named means includes an additional tube having a control grid and output circuit means for biasing said combining tubes to cut off, said plurality of muting tubes having a common load resistor and means for impressing the output voltage across said common load resistor on the control grid of said additional tube.

7. A diversity receiving system comprising a plurality of frequency modulation receivers including limiters and means for producing modulation frequency signal outputs, means for additively combining the outputs of the receivers including a cathode follower connected individually to the output of each receiver, a load impedance connected in common to the cathodes of all said cathode followers, whereby modulation frequency voltages are produced across said impedance, means for continuously varying the transconductance of each cathode follower inversely in accordance with the average noise output of only the receiver connected thereto, and means for deriving an output from said load impedance.

8. A diversity receiving system comprising a plurality of frequency modulation receivers including limiters and means for producing modulation frequency signal outputs, means for additively combining the outputs of the receivers Including a cathode follower connected individually to the output of each receiver, a load impedance connected in common to the cathodes of all said cathode followers, means for deriving an output from said load impedance, and means connected between each receiver and the cathode follower connected thereto for filtering out a noise component only from the output of said receiver, deriving a rectified voltage from the noise component and biasing said cathode follower with the rectified voltage.

9. A diversity receiving system comprising a plurality of radio receivers having instantaneous noise outputs of amplitudes N1, N2, N3, etc., respectively, and each having an instantaneous modulation frequency signal output of substantially the same amplitude S, means for combining the outputs of said receivers, said combining means including means comprising a plurality of cathode followers having a common load resistor for producing an output containing a modulation frequency signal component having an amplitude proportional to S and a noise component proportional to $$\sqrt{\left(\frac{N_1}{k}\right)^2+\left(\frac{N_2}{k}\right)^2 \cdots \left(\frac{N_k}{k}\right)^2}$$

where K is the number of receivers.

10. A system according to claim 9 including means for varying the gain of said combining means with respect to each noise output inversely in accordance with the average value thereof.

11. A system according to claim 10 wherein said receivers are frequency modulation receivers including limiting means.

References Cited in the file of this patent

UNITED STATES PATENTS

| | | |
|---|---|---|
| 2,301,649 | Thompson | Nov. 10, 1942 |
| 2,384,456 | Davey | Sept. 11, 1945 |
| 2,452,436 | Crosby | Oct. 26, 1948 |
| 2,488,193 | Hughes | Nov. 15, 1949 |
| 2,589,711 | Lacy | Mar. 18, 1952 |
| 2,644,885 | Atwood | July 7, 1953 |

FOREIGN PATENTS

| | | |
|---|---|---|
| 577,247 | Great Britain | May 10, 1946 |